United States Patent
Swansno

(10) Patent No.: US 7,345,469 B2
(45) Date of Patent: *Mar. 18, 2008

(54) AXLE ASSEMBLY WITH SENSOR MOUNT

(75) Inventor: Blair J. Swansno, Huntington Woods, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/714,285

(22) Filed: Mar. 5, 2007

(65) Prior Publication Data

US 2007/0145815 A1 Jun. 28, 2007

Related U.S. Application Data

(63) Continuation of application No. 11/001,496, filed on Dec. 1, 2004, now Pat. No. 7,205,760.

(60) Provisional application No. 60/555,192, filed on Mar. 22, 2004.

(51) Int. Cl.
*G01P 3/48* (2006.01)
*G01B 7/30* (2006.01)
*F16C 32/00* (2006.01)

(52) U.S. Cl. .......... 324/174; 324/207.22; 384/448

(58) Field of Classification Search .......... 301/124.1, 301/126, 131–132, 137; 180/905; 384/174, 384/207.22
See application file for complete search history.

(56) References Cited

U.S. PATENT DOCUMENTS

| | | | |
|---|---|---|---|
| 3,138,970 A | 6/1964 | Costa et al. | |
| 3,719,841 A | 3/1973 | Ritsema | |
| 3,949,841 A | 4/1976 | Jovick et al. | |
| 4,090,592 A | 5/1978 | Jovick et al. | |
| 4,864,231 A | 9/1989 | Okumura et al. | |
| 5,067,350 A * | 11/1991 | Grillo et al. | 73/494 |
| 5,308,171 A | 5/1994 | Sakamoto | |
| 5,451,868 A | 9/1995 | Lock | |
| 5,486,757 A * | 1/1996 | Easley | 324/174 |
| 5,998,988 A | 12/1999 | Dickmeyer et al. | |
| 6,133,729 A | 10/2000 | Mierzwinski | |
| 6,203,464 B1 * | 3/2001 | Ishikawa et al. | 475/150 |
| 6,375,359 B1 | 4/2002 | Miyazaki | |
| 6,537,979 B1 | 3/2003 | Kuo et al. | |
| 6,957,918 B2 * | 10/2005 | Beutler et al. | 384/448 |
| 7,205,760 B2 * | 4/2007 | Swanson | 324/174 |
| 2003/0160605 A1 * | 8/2003 | Michalek et al. | 324/174 |

* cited by examiner

*Primary Examiner*—Jason R. Bellinger
(74) *Attorney, Agent, or Firm*—Harness, Dickey & Pierce, P.L.C.

(57) ABSTRACT

A vehicle axle assembly having an axle housing, an axle shaft and a sensor. The axle housing has a tubular portion. A flat is formed on an annular wall of the tubular portion proximate a distal end of the tubular portion. A hole, which intersects the flat, is formed through the tubular portion. The axle shaft can have an integrally formed target portion that includes a plurality of teeth. The sensor is mounted in the hole and abuts the flat to space a tip of the sensor apart from the teeth of the target portion by a predetermined distance.

16 Claims, 3 Drawing Sheets

AXLE ASSEMBLY WITH SENSOR MOUNT

CROSS-REFERENCE TO RELATED APPLICATIONS

This application is a continuation of U.S. patent application Ser. No. 11/001,496 filed on Dec. 1, 2004 (now U.S. Pat. No. 7,205,760, issued on Apr. 17, 2007), which claims the benefit of U.S. Provisional Patent Application Ser. No. 60/555,192 filed on Mar. 22, 2004. The disclosure of the above application is incorporated herein by reference.

FIELD OF THE INVENTION

The present invention generally relates to vehicle axles and more particularly to an axle assembly that may include an axle housing with an integral mount for a wheel speed sensor and an axle shaft with an integral sensor target or exciter ring.

BACKGROUND OF THE INVENTION

Modern vehicles typically include an axle assembly having a housing and a differential assembly. The housing includes a cavity into which the differential assembly is positioned. The differential assembly is rotatably supported by the housing within the cavity. The differential assembly is mechanically coupled to the vehicle engine by a drive shaft. The differential assembly is also coupled to the vehicle drive wheels via a pair of axle shafts. The differential assembly regulates drive torque between the axle shafts, thereby permitting the shafts to rotate at different velocities as when one of the drive wheels is slipping.

Modern automotive vehicles frequently include systems, such as traction and stability control systems, that identify wheel slip conditions and responsively control the vehicle (e.g., engine, transmission, braking system) to reduce or eliminate wheel slip in certain instances. In such systems, a sensor is typically employed to sense the speed of a wheel or another component, such as the axle shaft, that has the rotational speed of the wheel.

One relatively common arrangement utilizes a Hall-effect sensor, which is mounted to the axle housing, and an exciter ring that is typically press-fit to the axle shaft. This arrangement typically employs a relatively large boss that is welded to the housing of the axle. Once the boss has been secured to the axle housing, several machining steps are required to drill and ream holes for the sensor, as well as to drill and tap a hole for the fastener that is employed to both orient the sensor and secure the sensor to the axle housing.

While such arrangements are suited for their intended purpose, they are nonetheless susceptible to improvement. For example, an arrangement that did not employ a discrete boss would be advantageous in that it would eliminate a part, eliminate the welding operation and would permit the sensor to be mounted relatively further outboard toward the brake mount flange where it would permit the sensor to mounted relatively closer to an outboard axle shaft support bearing. This latter aspect is important in that the sensor could be located to an area where the axle shaft experienced relatively less deflection. Also, an arrangement that did not employ a discrete sensor target, such as a sensor ring, would be advantageous in that it would eliminate a part.

Accordingly, a need exists for an axle assembly with a sensor mount which is smaller in size and reduces assembly time.

SUMMARY OF THE INVENTION

In one form, the present teachings provide a vehicle axle assembly having an axle housing, an axle shaft and a sensor. The axle housing has a tubular portion. A recess or flat is formed on an annular wall of the tubular portion proximate a distal end of the tubular portion, and a hole, which intersects the flat, is formed through the tubular portion. The axle shaft has an integrally formed target portion that includes a plurality of teeth. The sensor is mounted in the hole and abuts the flat to space a tip of the sensor apart from the teeth of the target portion by a predetermined distance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DESCRIPTION OF THE PREFERRED EMBODIMENTS

The following description of the preferred embodiment is merely exemplary in nature and is in no way intended to limit the invention, its application, or uses.

Figure 1:
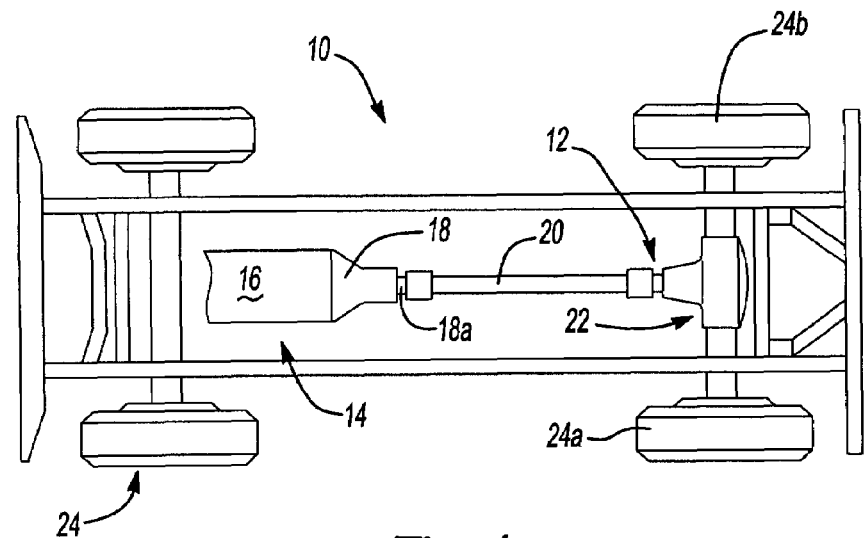
FIG. 1 is a schematic illustration of an exemplary vehicle constructed in accordance with the teachings of the present invention.

With reference to FIG. 1 of the drawings, a vehicle having an axle assembly that is constructed in accordance with the teachings of the present invention is generally indicated by reference numeral 10. The vehicle 10 includes a driveline 12 drivable via a connection to a power train 14. The power train 14 includes an engine 16 and a transmission 18. The driveline 12 includes a propshaft assembly 20, a rear axle assembly 22 and a plurality of wheels 24. The engine 16 is mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 also includes an output 18a and a gear reduction unit (not shown). The gear reduction unit is operable for coupling the transmission input to the output 18a of the transmission at a predetermined gear speed ratio. The propshaft assembly 20 is coupled for rotation with the output 18a of the transmission 18. Drive torque is transmitted through the propshaft assembly 20 to the rear axle assembly 22 where it is selectively apportioned in a predetermined manner to the left and right rear wheels 24a and 24b, respectively.

Figure 2:
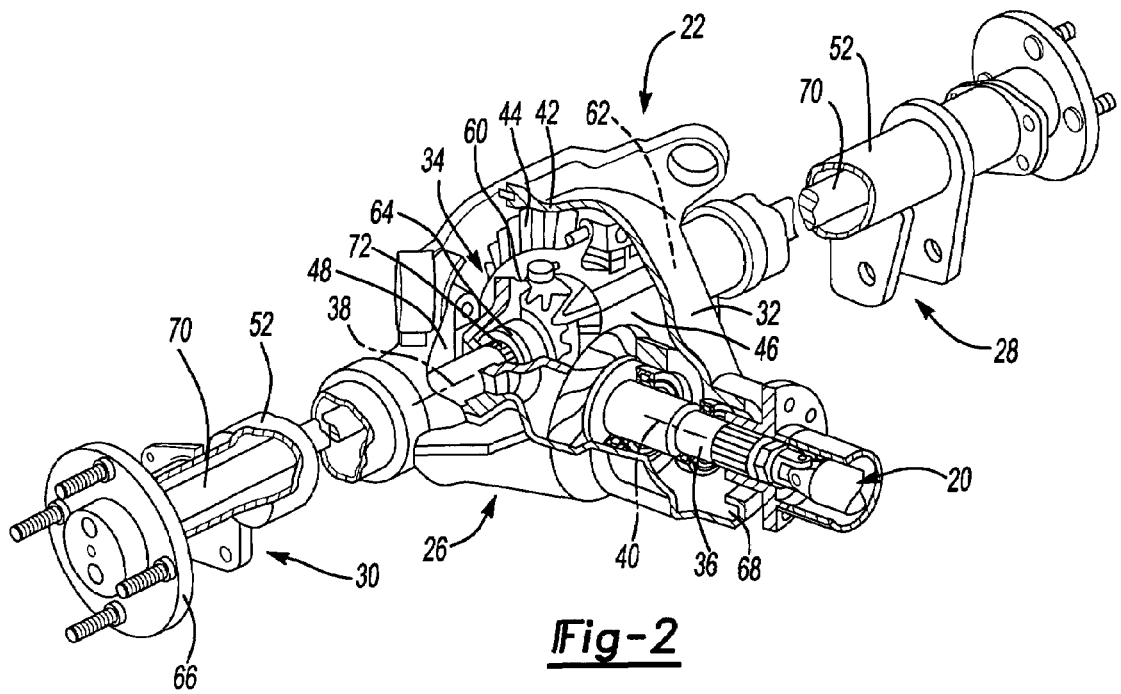
FIG. 2 is a partially cut away perspective view of a portion of the vehicle of FIG. 1 illustrating the rear axle assembly and propshaft in greater detail.

With additional reference to FIG. 2, the rear axle assembly 22 is shown to include a differential assembly 26, a left axle shaft assembly 28 and a right axle shaft assembly 30. The differential assembly 26 includes a housing 32, a differential unit 34 and an input shaft assembly 36. The housing 32 supports the differential unit 34 for rotation about a first axis 38 and further supports the input shaft assembly 36 for rotation about a second axis 40 that is perpendicular to the first axis 38.

The housing 32 includes a wall member 42 that defines a central cavity 44 having a left axle aperture 46, a right axle aperture 48 and an input shaft aperture 68. The housing 32 may include a pair of axle tubes 52 that are fixedly mounted to the wall member 42. With additional reference to FIG. 3, the axle tube 52 may include an annular collar 54, which may be formed by swaging or rolling, so as to provide a portion of the axle tube 52 with a wall thickness that is relatively thicker than adjacent portions of the axle tube 52. A recess or flat 56 may be formed (e.g., cast, machined) into the annular collar 54 of the axle tube 52. The flat 56 may be offset from the first axis 38 by a predetermined distance and may form a datum that will be discussed in greater detail, below. A hole 58, which intersects the flat 56, may be formed through the annular collar 54.

The differential unit 34 is disposed within the central cavity 44 of the housing 32 and includes a gearset 60. The gearset 60 includes first and second side gears 62 and 64, respectively, and a plurality of pinions (not shown). The left and right axle shaft assemblies 28 and 30 extend through the left and right axle apertures 46 and 48, respectively, where they are coupled for rotation about the first axis 38 with the first and second side gears 62 and 64, respectively. A flange 66, which may be employed to support a brake assembly (not shown), may be coupled to a distal end of both the left and right axle shaft assemblies 28 and 30.

The input shaft assembly 36 extends through the input shaft aperture 68 where it is supported in the housing 32 for rotation about the second axis 40. The input shaft assembly 36 is coupled for rotation with the propshaft assembly 20 and is operable for transmitting drive torque to the differential unit 34. More specifically, the drive torque received by the input shaft assembly 36 is transmitted to the differential unit 34 such that drive torque is distributed to the first and second side gears 62 and 64, causing the left and right axle shaft assemblies 28 and 30 to rotate about the first axis 38.

The left and right axle shaft assemblies 28 and 30 may include an axle shaft 70 that is supported for rotation in the axle tube 52 about the first axis 38. Each of the axle shafts 70 may include an externally splined portion 72 that may meshingly engage a mating internally splined portion (not specifically shown) that is formed into the first and second side gears 62 and 64, respectively.

Figure 3:
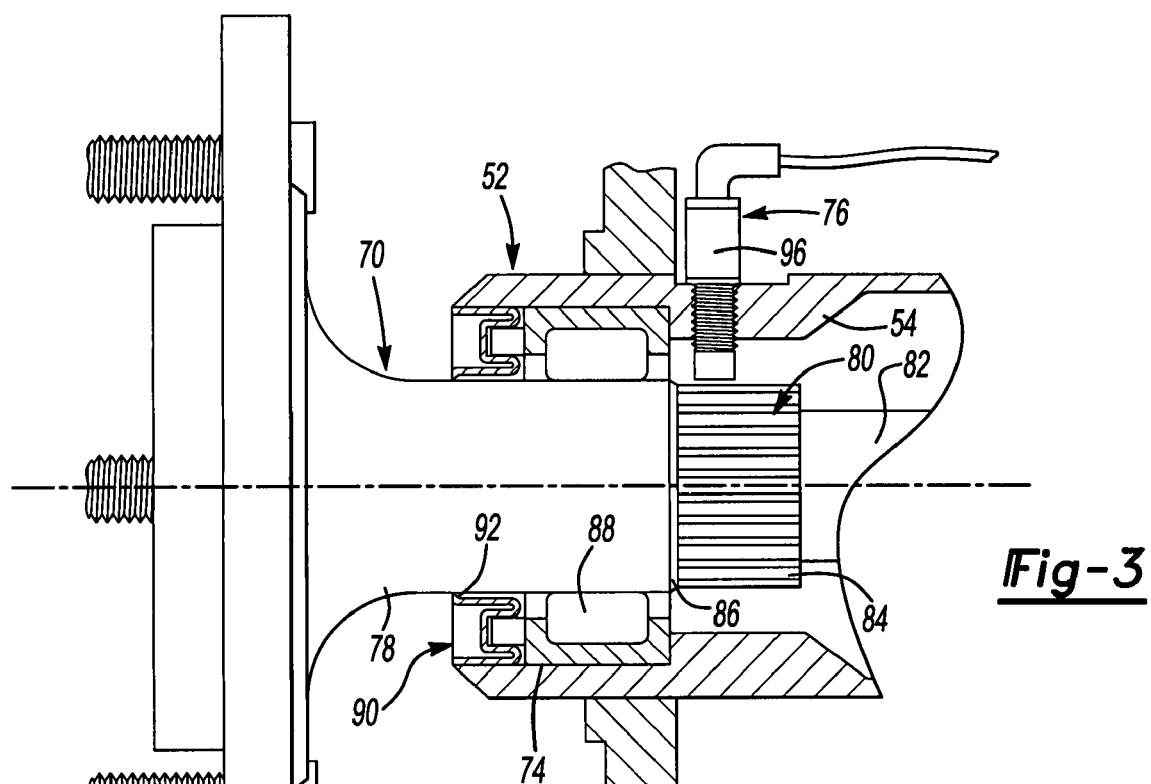
FIG. 3 is a sectional view of a portion of the rear axle assembly.
Figure 4:
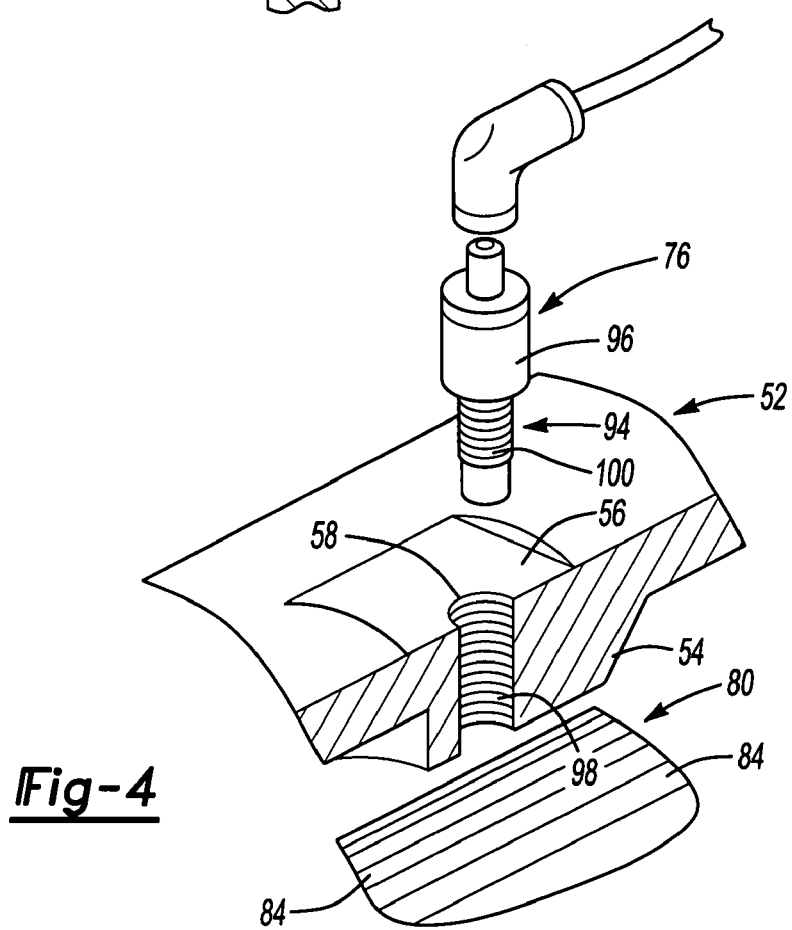
FIG. 4 is an exploded perspective view in partial section of the rear axle assembly.

With reference to FIG. 3, the left axle shaft assembly 28 is shown in greater detail. As one of ordinary skill in the art would appreciate from this disclosure, the left side of the axle assembly is generally a mirror image of the right side. As such, a detailed discussion of the left side will suffice for both. The left axle shaft assembly 28 may further include a bearing 74, axle shaft 70 and a sensor 76 that is coupled to the axle tube 52. Those of ordinary skill in the art will appreciate from this disclosure that although the particular axle assembly illustrated has a semi-floating configuration, the teachings of the present invention are applicable to other types of axle assemblies, including full-floating axle assemblies.

The axle shaft 70 may be integrally formed and may include a bearing support portion 78, a target portion 80, and an intermediate portion 82 onto which the externally splined portion 72 (FIG. 2) may be formed. The target portion 80 may have a plurality of target features, such as radially-extending, circumferentially spaced-apart teeth 84 that may be formed in a roll forming operation. In the particular example provided, the bearing support portion 78 is formed with a first diameter, the intermediate portion 82 is formed with a second, relatively smaller diameter and the target portion 80 is formed with a third diameter that is intermediate the diameters of the bearing support portion 78 and the intermediate portion 82. Appropriately sized and contoured transition sections 86 may be employed between the bearing support portion 78, the target portion 80 and the intermediate portion 82 so as to reduce stress concentrations, etc.

The bearing 74 may support the axle shaft 70 for rotation in the axle tube 52. In this regard, the bearing 74 may be pressed into the axle tube 52 such that elements (e.g., rollers 88) support the bearing support portion 78 of the axle shaft 70 when the axle shaft 70 is installed thereto. A conventional seal 90 may be coupled to the axle tube 52 in a conventional manner to retain lubricating fluids in the axle tube 52 as well as to inhibit the transmission of dirt, debris and other contaminants to the interior of the axle tube 52. The seal 90 may include one or more seal lips 92 that sealingly engage the bearing support portion 78 of the axle shaft 70.

If employed, the progressively increasing sizes of the intermediate portion 82, the target portion 80 and the bearing support portion 78 permit the axle shaft 70 to be installed to the axle tube 52 with relatively less risk of damaging the seal 90 as compared with the known axle assembly arrangements. In this regard, the target portion 80 of the axle shaft 70 is relatively smaller in diameter than the bearing support portion 78 and moreover, the amount by which the axle shaft 70 may be tilted relative to the first axis 38 is limited as a result of the length of the intermediate portion 82.

When the axle shaft 70 is installed to the axle tube 52, the target portion 80 is radially aligned to the flat 56 that is formed on an annular collar 54 of the axle tube 52. A sensor 76, which may be a Hall-effect sensor, may be installed directly to the axle tube 52. In the particular example provided, the sensor 76 includes a body portion 94 and an abutting flange 96 and the sensor 76 is an active Hall-effect sensor.

The hole 58 in the axle tube 52 may including a mating threaded portion 98 that is configured to threadably receive the threads 100 that are formed on the body portion 94 of the sensor 76. The increased thickness of the annular collar 54 ensures that the threads 100 of the body portion 94 and the mating threaded portion 98 engage one another over a distance that is sufficient to fixedly but removably secure the sensor 76 to the axle tube 52. Optionally, a sealant (not shown) may be applied to the threads 100 and/or a seal member, such as an O-ring (not shown), may be employed to form a seal against the axle tube 52 to inhibit fluid communication through the hole 58.

In contrast to the known arrangements, the present configuration eliminates two components, i.e., a boss (not shown) that would otherwise be welded to the axle tube and a discrete sensor target (not shown) that would otherwise be coupled, e.g., press-fit, to the axle shaft. The reduction in part count not only reduces the overall cost of the system, it also improves the performance and reliability of the system through the elimination of stack-up. Moreover, as a relatively large boss (not shown) is not employed, the location of the sensor 76 may be place relatively closer to the flange 66 that supports the brake assembly (not shown).

Figure 5:
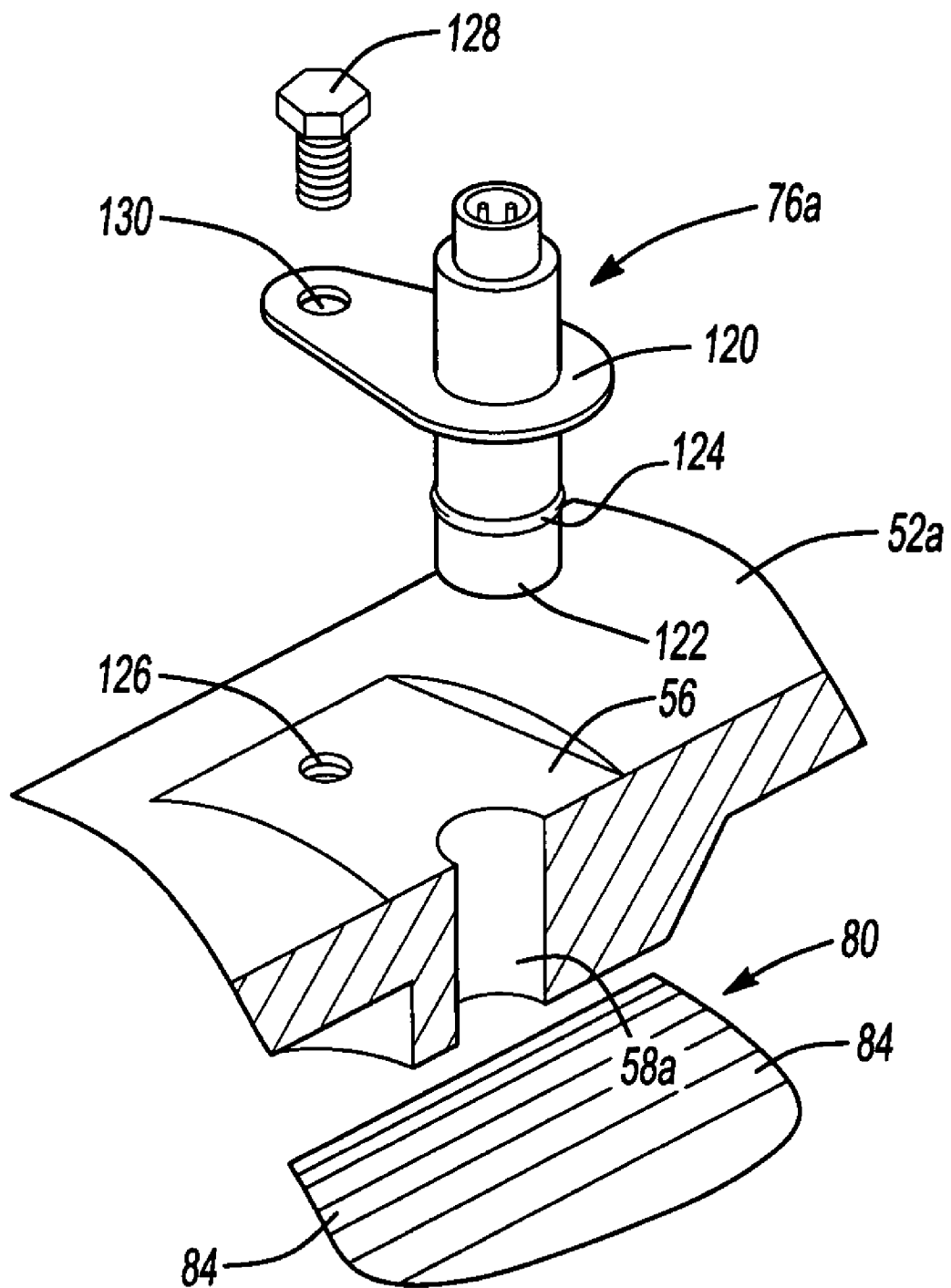
FIG. 5 is a sectional view illustrating a portion of a second rear axle assembly constructed in accordance with the teachings of the present invention.

While the hole 58 has been described thus far as including a mating threaded portion 98 that is adapted to threadably engage the sensor 76, those skilled in the art will appreciate that the invention, in its broader aspects, may be constructed somewhat differently. For example, another mechanical fastening means may be employed to secure the sensor to the axle tube 52 and/or to orient the sensor in a particular orientation as shown in FIG. 5. In this embodiment, the sensor 76a includes a mounting flange 120 that is axially spaced apart from and disposed about the tip 122 of the sensor 76a. The hole 58a in the axle tube 52a is not threaded but rather sized to receive a portion of the sensor 76a. A seal member, such as an O-ring 124, may be fitted about the body of the sensor 76a and configured to sealingly engage the side of the hole 58a. An auxiliary hole 126 is also formed into or through the axle tube 52a and is sized to threadably engage a fastener 128 that is employed to both secure the sensor 76a to the axle tube 52a and orient the sensor 76a in a desired manner. The fastener 128 is fitted through an associated aperture 130 in the mounting flange 120 and threadably engages the auxiliary hole 126.

While the invention has been described in the specification and illustrated in the drawings with reference to various embodiments, it will be understood by those skilled in the art that various changes may be made and equivalents may be substituted for elements thereof without departing from the scope of the invention as defined in the claims. Furthermore, the mixing and matching of features, elements and/or functions between various embodiments is expressly contemplated herein so that one of ordinary skill in the art would appreciate from this disclosure that features, elements and/or functions of one embodiment may be incorporated into another embodiment as appropriate, unless described otherwise, above. Moreover, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. An axle assembly comprising:
   an axle housing defining a central cavity and including a tubular portion with a sensor mount formed proximate to a distal end of said axle housing, said sensor mount including a recess formed in an outer surface of said tubular portion to define a mount surface and a hole extending through said mount surface;
   a differential rotatably supported by said axle housing within said central cavity;
   an axle shaft rotatably supported in said tubular portion of said axle housing and having an end portion and a target portion, said end portion coupled to said differential and said target portion aligned with said hole in said sensor mount; and
   a sensor secured to said sensor mount such that a tip portion of said sensor is in proximity to said target portion of said axle shaft and a body portion of said sensor engages said mount surface of said recess.

2. The axle assembly of claim 1 wherein said target portion of said axle shaft includes a plurality of teeth.

3. The axle assembly of claim 2 wherein said teeth are formed integrally on said axle shaft.

4. The axle assembly of claim 1 wherein said tubular portion of said axle housing includes a collar having a wall thickness that is larger than a wall thickness at said distal end of said tubular portion, and wherein said recess is formed in said collar.

5. The axle assembly of claim 1 wherein said hole through said mount surface includes threads, and wherein said sensor includes a threaded portion between said tip portion and said body portion adapted for threaded retention in said threads of said hole.

6. The axle assembly of claim 1 wherein said sensor includes a mounting flange engaging said mount surface and having a hole alignable with a second hole formed in said mount surface, and wherein a fastener passes through said hole in said mounting flange and is retained in said second hole in said mount surface for securing said sensor in said recess of said tubular portion.

7. The axle assembly of claim 1 wherein said mount surface is planar and oriented to be generally parallel to a rotary axis of said axle shaft within said tube portion.

8. An axle assembly, comprising:
   an axle housing defining a central cavity and first and second axle apertures;
   a first axle tube having a first end secured to said first axle aperture and a sensor mount formed proximate a second end of said first axle tube, said sensor mount including a recess formed in an outer surface of said first axle tube to define a mount surface and a hole extending through said mount surface;
   a second axle tube having a first end secured to said second axle aperture;
   a differential rotatably supported within said central cavity and having first and second outputs;
   a first axle shaft rotatably supported within said first axle tube and having a first end coupled for rotation with said first output of said differential;
   a second axle shaft axle shaft rotatably supported within said second axle tube and having a first end coupled for rotation with said second output of said differential; and
   a sensor secured to said sensor mount such that a tip portion is in proximity to a target portion of said first axle shaft located proximate to a second end of said first axle shaft and a body portion engages said mount surface of said recess.

9. The axle assembly of claim 8 wherein said target portion of said first axle shaft includes a plurality of teeth.

10. The axle assembly of claim 9 wherein said teeth are formed integrally on said first axle shaft.

11. The axle assembly of claim 8 wherein said first axle tube includes a collar portion proximate its second end having a wall thickness that is greater than a wall thickness of said second end, and wherein said recess is formed in said collar portion.

12. The axle assembly of claim 8 wherein said hole through said mount surface includes threads, and wherein said sensor includes a threaded portion between said tip portion and said body portion adapted for threaded retention in said threads of said hole.

13. The axle assembly of claim 8 wherein said sensor includes a mounting flange engaging said mount surface and having a hole alignable with a second hole formed in said mount surface, and wherein a fastener passes through said hole in said mounting flange and is retained in said second hole in said mount surface for securing said sensor in said recess of said first axle tube.

14. The axle assembly of claim 8 wherein said mount surface is planar and oriented to be generally parallel to a rotary axis of said first axle shaft within said first axle tube.

15. A method comprising:
providing an axle housing having a center chamber communicating with an elongated axle tube;
forming a recess in an outer surface of said axle tube proximate a distal end of said axle tube and a sensor aperture extending through said recess;
installing a differential for rotation within said center chamber of said axle housing;
providing an axle shaft having a target portion;
inserting said axle shaft into said axle tube such that a first end of the axle shaft is coupled to said differential and a second end of said axle shaft extends outwardly from said axle tube with said target portion aligned with said sensor aperture; and
inserting a sensor into said sensor aperture for aligning a tip portion of said sensor in proximity to said target portion and abutting a body portion of said sensor against said recess.

16. The method of claim 15 further comprising the step of threading said sensor into said sensor aperture.

* * * * *